United States Patent
Chen et al.

(10) Patent No.: US 6,895,316 B2
(45) Date of Patent: May 17, 2005

(54) CUSTOMERIZED DRIVING ENVIRONMENT SETTING SYSTEM FOR USE IN A MOTOR VEHICLE

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei City (TW)

( * ) Notice: Subject to any disclaimer, the term of this patent is extended or adjusted under 35 U.S.C. 154(b) by 7 days.

(21) Appl. No.: 10/255,711

(22) Filed: Sep. 27, 2002

(65) Prior Publication Data

US 2004/0019416 A1 Jan. 29, 2004

(30) Foreign Application Priority Data

Jul. 26, 2002 (TW) ..................................... 91211521 U

(51) Int. Cl.[7] ............................................... G06F 7/00
(52) U.S. Cl. ............................... 701/36; 701/1; 340/5.6; 340/5.65; 340/426.14
(58) Field of Search .................................. 725/131–134, 725/114; 340/3.1, 3.2, 426.13, 426.14, 825.22, 825.25, 5, 6, 5.61, 5.65, 5.66, 5.72, 426.1, 438, 5.5; 701/29–30, 33, 1, 36, 49, 35; 235/492, 384; 455/412.1, 410, 411

(56) References Cited

U.S. PATENT DOCUMENTS

| | | | | | |
|---|---|---|---|---|---|
| 5,806,018 A | * | 9/1998 | Smith et al. | ................. | 701/211 |
| 5,815,071 A | * | 9/1998 | Doyle | ........................ | 340/439 |
| 5,987,534 A | * | 11/1999 | Shibayama | .................. | 710/14 |
| 5,995,965 A | * | 11/1999 | Experton | ..................... | 707/10 |
| 6,055,512 A | * | 4/2000 | Dean et al. | .................... | 705/17 |
| 6,127,947 A | * | 10/2000 | Uchida et al. | .............. | 340/999 |
| 6,185,487 B1 | * | 2/2001 | Kondo et al. | ................. | 701/22 |
| 6,198,996 B1 | * | 3/2001 | Berstis | ........................ | 701/36 |
| 6,505,780 B1 | * | 1/2003 | Yassin et al. | ............... | 235/492 |
| 6,584,381 B2 | * | 6/2003 | Gehrke | .......................... | 701/1 |
| 6,584,389 B1 | * | 6/2003 | Reimann et al. | ............. | 701/49 |
| 6,587,756 B2 | * | 7/2003 | Moriguchi et al. | ........... | 701/1 |
| 6,609,655 B1 | * | 8/2003 | Harrell | ....................... | 235/380 |
| 6,615,123 B2 | * | 9/2003 | Morehouse | .................. | 701/49 |
| 6,622,083 B1 | * | 9/2003 | Knockeart et al. | .......... | 701/202 |
| 6,665,600 B2 | * | 12/2003 | Miller et al. | .................. | 701/49 |
| 6,675,082 B2 | * | 1/2004 | Galli et al. | ..................... | 701/49 |
| 6,775,603 B2 | * | 8/2004 | Yester et al. | .................. | 701/36 |
| 2002/0096572 A1 | * | 7/2002 | Chene et al. | ................. | 236/62 |
| 2002/0100808 A1 | * | 8/2002 | Norwood et al. | ........... | 235/486 |
| 2002/0199208 A1 | * | 12/2002 | Chang et al. | ............... | 725/131 |
| 2003/0204296 A1 | * | 10/2003 | Galli et al. | ..................... | 701/49 |
| 2003/0231550 A1 | * | 12/2003 | Macfarlane | ................. | 367/198 |
| 2004/0044454 A1 | * | 3/2004 | Ross et al. | ..................... | 701/33 |

* cited by examiner

*Primary Examiner*—Jacques H. Louis-Jacques
(74) *Attorney, Agent, or Firm*—Bacon & Thomas, PLLC

(57) ABSTRACT

A customerized driving environment setting system in which a portable memory card having multiple setting data stored therein is insertable into a card reader/writer on a motor vehicle and a motor vehicle wireless download device is controlled to download updated data from a remote customs service center wirelessly for updating the setting data of the portable memory card. Accessing of the card reader/writer to the portable memory card enables the user to set the accessories of the motor vehicle subject to the setting data of the portable memory card quickly, and to update the setting data of the portable memory card wirelessly. The user can carry the portable memory card to the repair shop, information station, and home computer to update the setting data anytime and anywhere.

6 Claims, 4 Drawing Sheets

CUSTOMERIZED DRIVING ENVIRONMENT SETTING SYSTEM FOR USE IN A MOTOR VEHICLE

BACKGROUND OF THE INVENTION

1. Field of the Invention

The present invention relates to a customerized driving environment setting system for use in a motor vehicle and, more particularly, to such a customerized driving environment setting system, which enables the owner of a motor vehicle to update the driving environment anytime and anywhere, and to download updated data wirelessly to update the setting data.

2. Description of Related Art

In recent years, following great improvement of the standards of living, most people would like to have one's own transportation vehicle. Either going to the office or school, or going outsides for sightseeing on holidays, many people use the private car as one's personal transportation vehicle.

In order to fit individual's favorite, car suppliers are continuously providing high quality models having added values or added functions. Nowadays, motor vehicle accessories such as mobile telephone system, satellite navigation system, multimedia audio video system, electric seat, and etc. that were used in high-class models in early days have now become standard attachments to a regular car. However, the setting of these attachments is complicated. The car owner may have to set the attachments of the car individually before or during driving subject to one's favorite. When changing the driver, the new driver may have to adjust the setting of every attachment of the car again.

Furthermore, the car owner himself cannot update the computer software built in every accessory of the car. When updating or upgrading the computer software of every accessory of the car, the car owner shall have to drive the car to a particular repair shop or the original car supplier, asking the trained engineer to update the setting data. This setting data updating procedure is very inconvenient and wastes much time of the car owner.

Therefore, it is desirable to provide a customerized driving environment setting system that eliminates the aforesaid problem.

SUMMARY OF THE INVENTION

It is the main object of the present invention to provide a customerized driving environment setting system that enables the user to update the internal data of a portable storage medium anytime and anywhere, and easily to set the driving environment of the motor vehicle subject to user's personal favorite.

It is another object of the present invention to provide a customerized driving environment setting system that enables the user to update the setting data wirelessly.

To achieve these and other objects of the present invention, the customerized driving environment setting system comprises a data bus electrically connected to at least one motor vehicle accessory; a portable storage medium having stored therein multiple setting data adapted to set the at least one motor vehicle accessory subject to a respective predetermined status of use; an electromagnetic card reader/writer electrically connected to the data bus; and a controller electrically connected to the data bus and adapted to control the electromagnetic card reader/writer to read the setting data from the portable storage medium for setting the status of use of the at least one motor vehicle accessory subject to the setting data. The portable storage medium can be an IC memory card of 64 KB, 128 KB, or any of various different capacities, or a high capacity storage medium such as compact flash card, smart media card, memory stick card, and preferably a 16 MB IC high capacity card.

The customerized driving environment setting system further comprises a wireless download device, such as GSM module, GPRS module, pager module, and etc., adapted to download an updated data on board from a remote customs service center wirelessly, for enabling the electromagnetic card reader/writer to write the updated data into the portable storage medium to update the setting data.

Except wireless download, the portable storage medium can also be carried and taken out to a remote computer to update the setting data. The remote computer can be connected to a remote customs service center through a wired network, such as the Internet, or through a wireless network to download updated data. The remote computer can be the car owner's home computer, or an information station installed in airport, railway station, post office, bank, contracted repair shop, convenience shop, or contracted vendor. Through the remote computer distributed everywhere, the car owner can update the setting data of the portable storage medium anytime and anywhere which is very convenient.

Furthermore, the car owner can directly input data into the portable storage medium through an input device in the car or a input device of the remote computer. For example, through the keyboard of the mobile telephone of the car, the voice control device of the car, or the mouse and keyboard of the home computer, etc., the car owner can update the setting data of the portable storage medium very conveniently.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
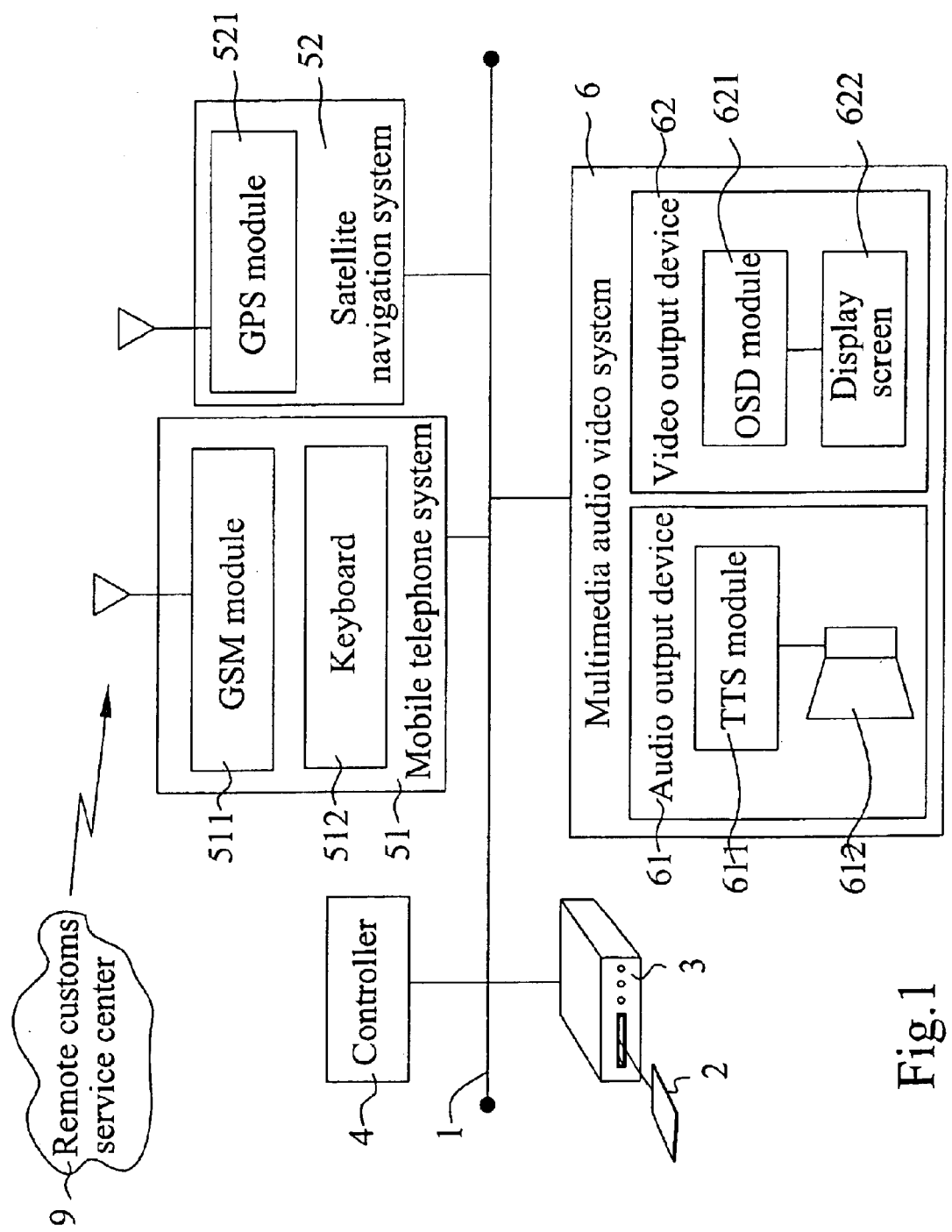
FIG. 1 is a block diagram showing the system architecture of the present invention.

Referring to FIG. 1, a customerized driving environment setting system installed in a car according to the present invention is shown comprising an electromagnetic card reader/writer 3, a controller 4, and a plurality of motor vehicle accessories which are all connected to a data bus 1 (for example, CAN bus) of the electric system of the car. The card reader/writer 3 is an electromagnetic data reader and writer that can read and write to a portable memory card 2. The portable memory card 2 is an electromagnetic data storage medium. According to this embodiment, the portable memory card 2 is a 16 MB high capacity IC card for the storage of a huge amount of data to set a plurality of accessories of the car subject to the predetermined status of use. When the portable memory card 2 is inserted into the card reader/writer 3, the controller 4 may control the card reader/writer 3 to read/write data from/to the portable memory card 2.

When entered the car, the car owner inserts his personal portable memory card 2 into the card reader/writer 3, letting the card reader/writer 3 read several kinds of setting data from the inserted portable memory card 2 and the controller 4 set the status of use of every accessory of the car to a predetermined status according to the setting data read from the inserted portable memory card 2. For example, the setting of the mobile telephone system 51 of the car is outlined hereinafter with reference to FIG. 2. The portable memory card 2 has stored therein the car owner's personal PIN code, and car owner's personal telephone menu setting data 53, which includes car owner's mobile telephone number 531, frequent-use telephone numbers 532 of two hundred persons with Chinese/English names, twenty caller ID telephone numbers 533, twenty dial-out telephone numbers 534, twenty quick-dial telephone numbers 535, one redial telephone number 536, and etc. When the car owner inserted his personal portable memory card 2 into the card reader/writer 3 after entered the car, the controller 4 controls the card reader/writer 3 to read the aforesaid car owner's personal telephone menu setting data 53 and to restore the read data into the memory of the mobile telephone system 51 to replace the old data in the memory, thereby causing the setting of the mobile telephone system 51 to be changed to the car owner's personal mobile telephone system environment. Further, subject to a strategy alliance with a telecommunication company, the data of the SIM card 530 can also be stored in the personal portable memory card 2 to identify the car owner when logging into the telecommunication network.

Figure 2:
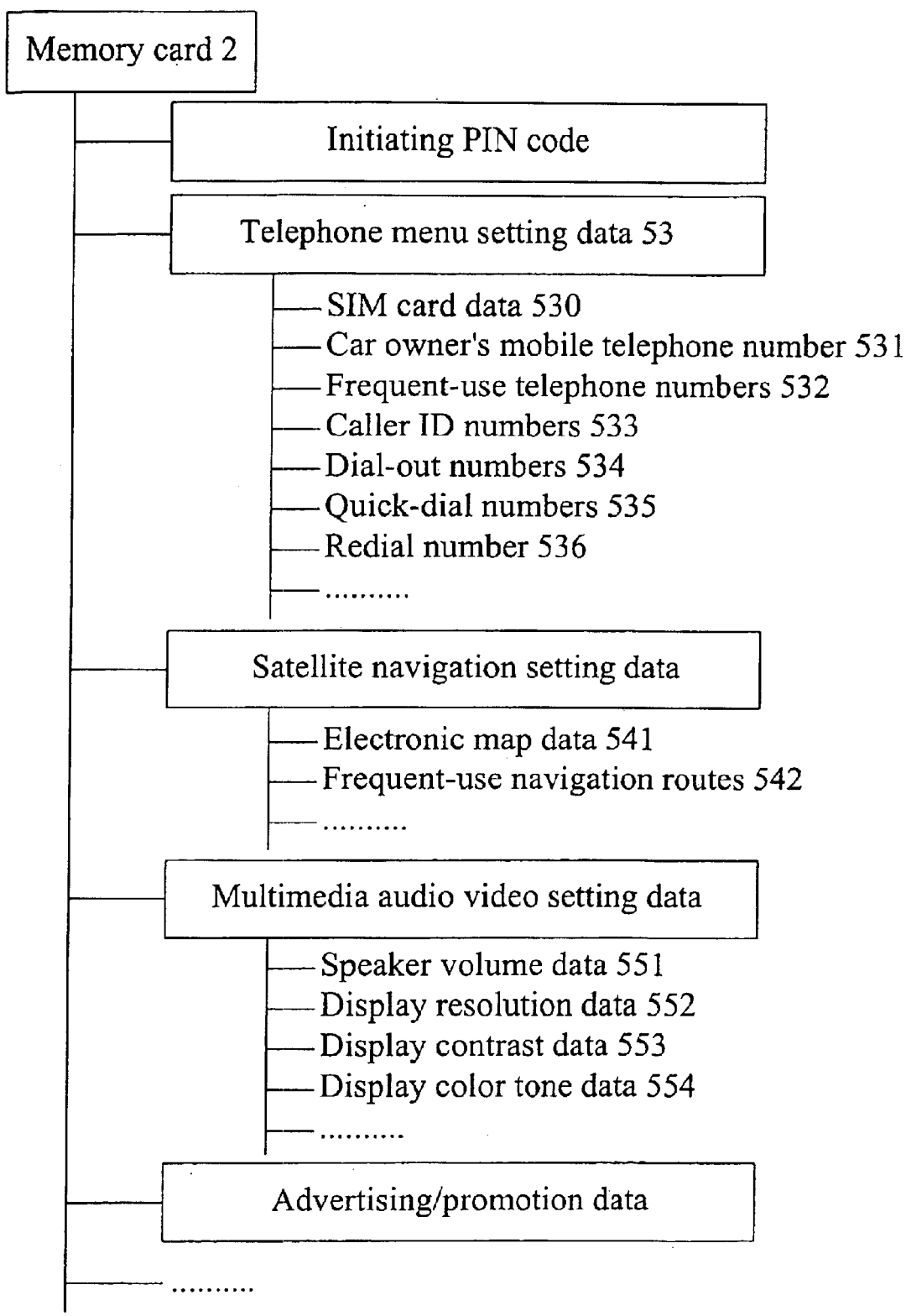
FIG. 2 is a schematic drawing showing the telephone menu data content of the portable memory card according to the present invention.

The aforesaid personal portable memory card 2 can be stored with a variety of motor vehicle accessories' setting data indicated in FIGS. 1 and 2, such as electronic map data 541 and frequent-use navigation routes 542 for setting satellite navigation system 52, speaker 612's voice volume data 551 and display screen 622's resolution data 552, contrast data 553 and color tone data 554 for setting multimedia audio video system 6. Other setting data of motor vehicle accessories not indicated in figures can also be stored in the portable memory card 2, such as frequent-use radio channel setting data, sliding position data and seat back titling angle data for setting electric seat, temperature and humility data for setting air-condition system, sensitivity data for setting burglar alarm system, etc. Advertising data of contracted companies or commercial promotion data can also be gathered and stored in the so-called "all-in-one" personal portable memory card 2. Because the "all-in-one" portable memory card 2 can put setting data of a variety of motor vehicle accessories together and can also be conveniently carried by the user, it can be used to set personalized driving environment.

Referring to FIG. 1 again, the mobile telephone system 51 has a GSM (Groupe Speciale Mobile) module 511, and a keyboard 512 for data input. Through the keyboard 512, the user can control the card reader/writer 3 to update the data of the portable memory card 2 manually. The GSM module 511 of the mobile telephone system 51 can be used as a wireless download device. Through the GSM module 511, the user can download updated data from the remote customs service center 9 wirelessly. Then the controller 4 controls the card reader/writer 3 to write the downloaded updated data into the portable memory card 2. Because the present invention allows the user to download a variety of updating data wirelessly when driving, the user can update the setting data of the portable memory card 2 wirelessly in anytime and anywhere.

The wireless download device can alternatively be a GPRS (General Packet Radio Service) module, CDMA (Code Division Multiple Access) module, or any of a variety of equivalent wireless communication modules that achieve the same effect. The transmission mode can adopt data transmission, short message, digital broadcasting, or any of a variety of other equivalent methods.

In addition to the aforesaid car accessories setting data, the wireless updating content further include computer software for motor vehicle accessories, for example, computer software for GSM module 511, mobile telephone system 51, GPS (Global Positioning System) module 521, TTS (Text to Speech) module 611 of audio output device 61, OSD (On Screen Display) module 621 of video output device 62, and etc. The user can download the newly updated version of the related computer software anytime and anywhere without going back to the car supplier personally.

Figure 3:
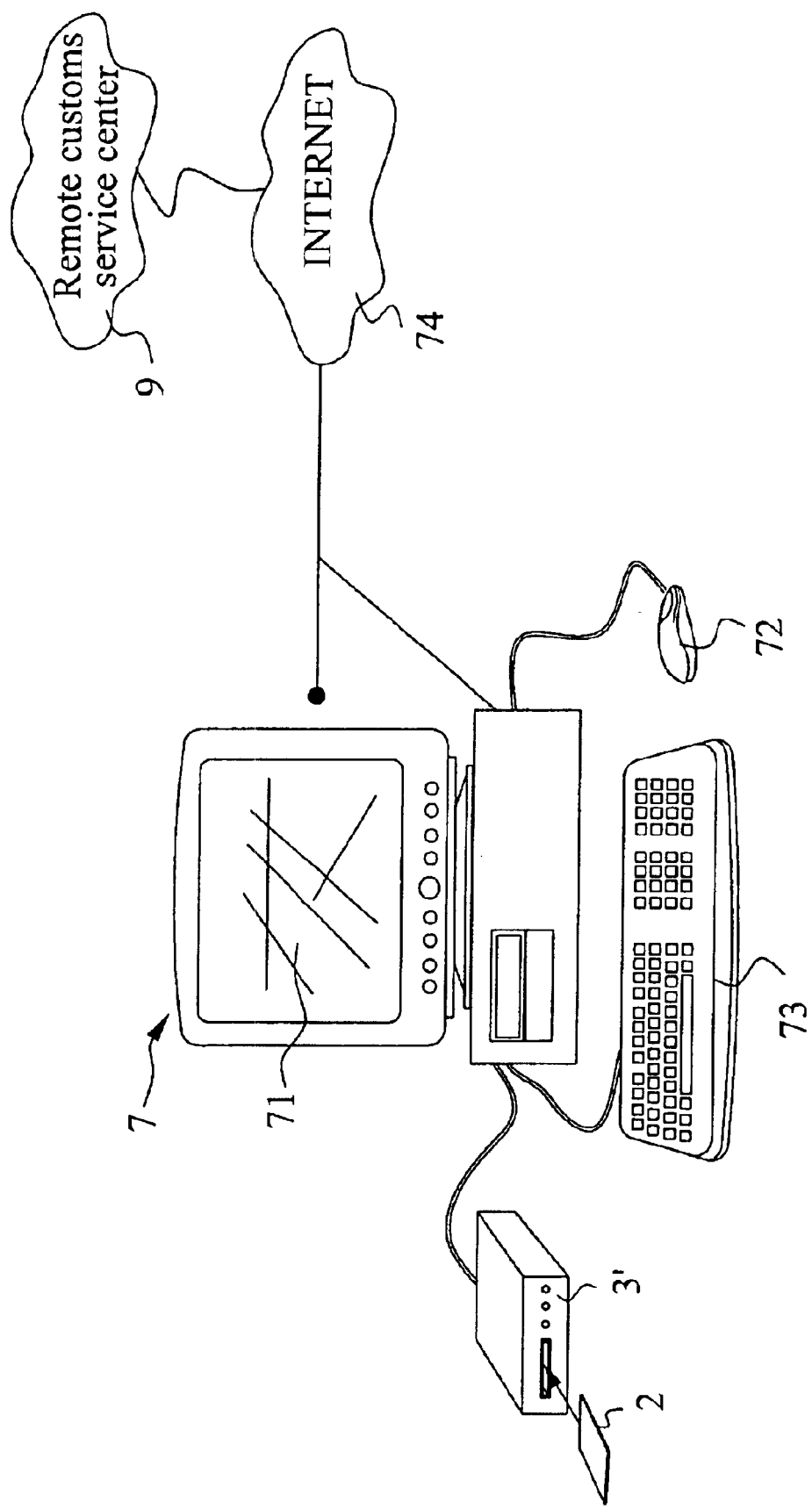
FIG. 3 is a schematic drawing showing the remote computer installed in car owner's home according to the present invention.

One main feature of the portable memory card 2 is its high portability and its updatability anywhere, i.e., the user can carry and take out the portable memory card 2 away from the car to a computer at a remote place to update the data. As shown in FIG. 3, the user can bring the portable memory card 2 home, and easily use the big display screen 71, big keyboard 73, and mouse 72 (or voice input device) of a home computer system 7 to update the data of the portable memory card 2. When the home computer system 7 connected to the Internet 74, the user can log in the server of the remote customs service center 9 to use its powerful navigation server to update navigation routes and download updated data, enabling the card reader/wirer 3' of the home computer system 7 to write updated data into the portable memory card 2. The user can also request the server of the remote customs service center 9 to download the updated data wirelessly to the GSM module 511 of the car in a preferable time or specific date to update the content of the portable memory card 2.

Figure 4:
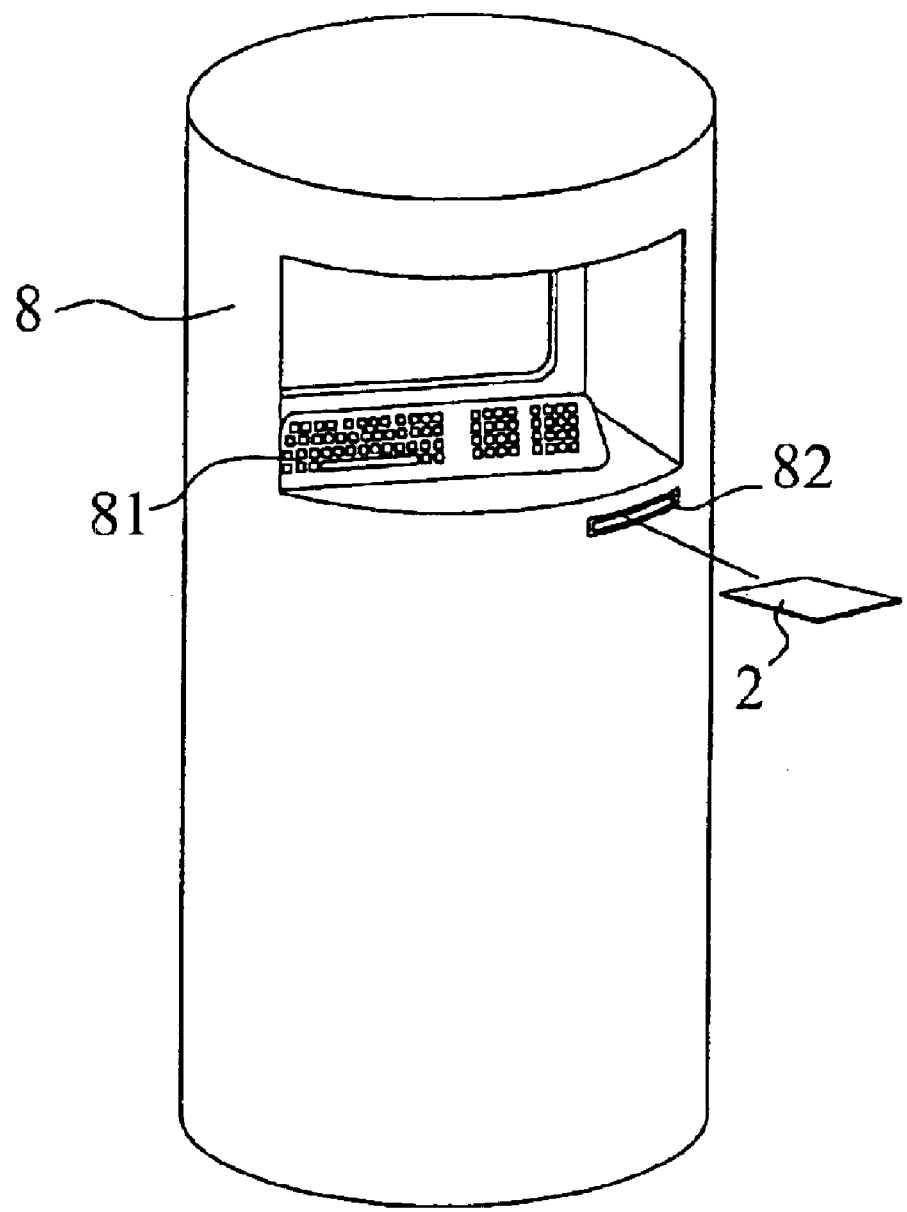
FIG. 4 is a schematic drawing showing the information station installed in an airport according to present invention.

Referring to FIG. 4, a remote computer, for example, the information station 8 installed in airport, railway station, bus station, post office, bank, convenience shop, service park of super highway, contracted repair shop, contracted vendor, or the like can also be used to update the data of the portable memory card 2. The information station 8 has a card slot 82 adapted to receive the user's portable memory card 2, and a keyboard 81 for data entry. The information station 8 is connectable to the remote customs service center through a wired network (Internet, intranet, extranet) or wireless network. Thus the user can easily choose the nearest place in time, or choose the most convenient place spread in everywhere, to update the data of his (her) portable memory card 2.

Although the present invention has been explained in relation to its preferred embodiments, it is to be understood that many other possible modifications and variations can be made without departing from the spirit and scope of the invention as hereinafter claimed.

What is claimed is:

1. A customerized driving environment setting system for use in a motor vehicle comprising:

a data bus electrically connected to at least one motor vehicle accessory;

a portable storage medium having stored therein multiple setting data adapted to set said at least one motor vehicle accessory subject to a respective predetermined status of use, wherein said portable storage medium is connectable to one of a plurality of information stations which are located in different places and respectively linked to a remote customs service center via a communication network, said plurality of information stations being arranged to download updated data from said remote customs service center for updating the setting data of said portable storage medium;

an electromagnetic card reader/writer situated in said motor vehicle and electrically connected to said data bus;

a controller electrically connected to said data bus and adapted to control said electromagnetic card reader/writer to read said setting data from said portable storage medium for setting the status of use of said at least one motor vehicle accessory subject to said setting data;

a wireless download device connected to said electromagnetic card reader/writer for wirelessly receiving undated data directly from a customs service center and downloading said updated data to said portable storage medium;

a manual input device connected to said electromagnetic card reader/writer for manually inputting at least one updated data into said portable storage medium, wherein said portable storage medium is a portable memory card, and wherein said wireless download device enables automatic updating of said portable memory card, and said input device enables a user to control the card reader/writer to update the data of the portable memory card manually.

2. The customerized driving environment setting system as claimed in claim 1, wherein said portable memory card is a high capacity IC card.

3. The customerized driving environment setting system as claimed in claim 1, wherein said at least one motor vehicle accessory includes at least one of the motor vehicle accessory group of GSM (Groupe Speciale Mobile) module, mobile telephone, GPS (Global Positioning System) module, SNS (Satellite Navigation System), multimedia audio video system, radio, electric seat, air-conditioning system, and burglar-alarm system.

4. The customerized driving environment setting system as claimed in claim 1, wherein said manual input device is a keyboard of a mobile telephone of the motor vehicle.

5. The customerized driving environment setting system as claimed in claim 1, wherein one of the plurality of information stations is a home computer of the user.

6. The customerized driving environment setting system as claimed in claim 1, wherein at least one of the plurality of information stations is installed at a location selected from the group consisting of an airport, railway station, bus station, post office, bank, convenience shop, service area of a super highway, contracted repair shop, contracted vendor.

* * * * *